(12) United States Patent
Kim et al.

(10) Patent No.: US 11,487,375 B2
(45) Date of Patent: Nov. 1, 2022

(54) TOUCH SENSOR

(71) Applicant: DONGWOO FINE-CHEM CO., LTD., Iksan-si (KR)

(72) Inventors: Heon Kim, Pyeongtaek-si (KR); Hyun Min Shin, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 17/195,053

(22) Filed: Mar. 8, 2021

(65) Prior Publication Data

US 2021/0286457 A1 Sep. 16, 2021

(30) Foreign Application Priority Data

Mar. 10, 2020 (KR) .................. 10-2020-0029428

(51) Int. Cl.
*G06F 3/041* (2006.01)
*B32B 37/00* (2006.01)
*B32B 37/14* (2006.01)
*G06F 3/044* (2006.01)
*G02B 5/30* (2006.01)

(52) U.S. Cl.
CPC .......... *G06F 3/0412* (2013.01); *B32B 37/003* (2013.01); *B32B 37/14* (2013.01); *G02B 5/3025* (2013.01); *G06F 3/0443* (2019.05); *G06F 3/0445* (2019.05); *B32B 2457/208* (2013.01)

(58) Field of Classification Search
None
See application file for complete search history.

(56) References Cited

U.S. PATENT DOCUMENTS

2017/0372115 A1* 12/2017 Lee .................. G06F 3/0445
2021/0132721 A1* 5/2021 Li ..................... G06F 3/044
2021/0405787 A1* 12/2021 Huang ................ H05K 1/189

FOREIGN PATENT DOCUMENTS

KR 10-2011-0116421 A 10/2011

* cited by examiner

*Primary Examiner* — Brian M Butcher
(74) *Attorney, Agent, or Firm* — Sughrue Mion, PLLC

(57) ABSTRACT

A touch sensor comprises a touch sensor layer having an electrode pad portion formed in a bezel area, and a polarizing layer coupled to the touch sensor layer while opening an area of the electrode pad portion and having a side surface of an area of the electrode pad portion defining an altered surface and a side surface excluding the area of the electrode pad portion defining a straight line surface. The altered surface and the straight line surface have a cross-sectional inclination angle of 30° or less in a lateral direction with respect to a vertical direction.

8 Claims, 4 Drawing Sheets

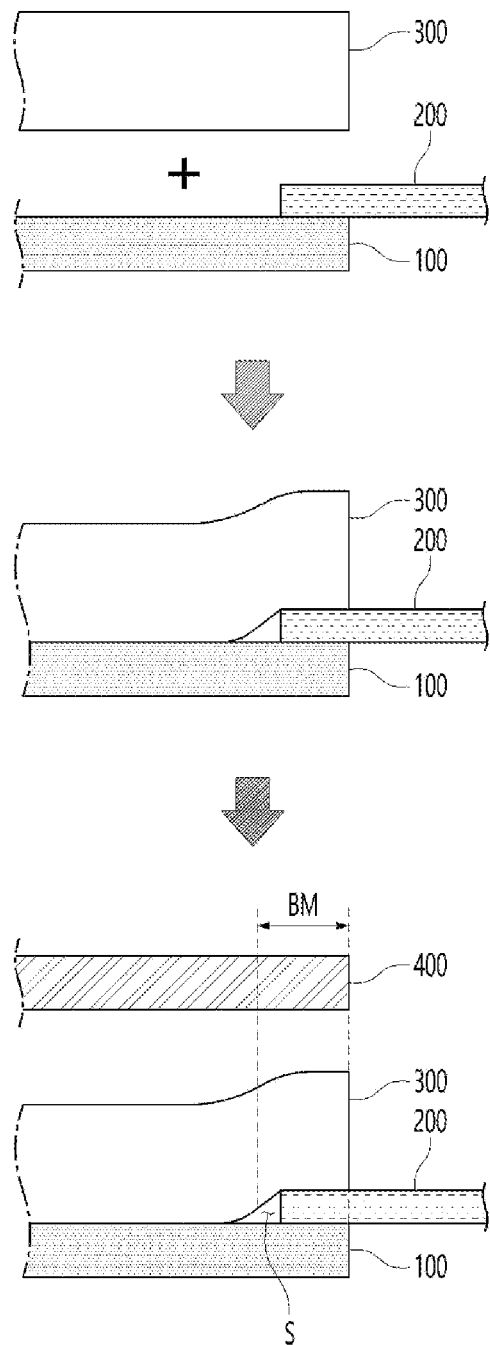
[Figure 1] PRIOR ART

【Figure 2】
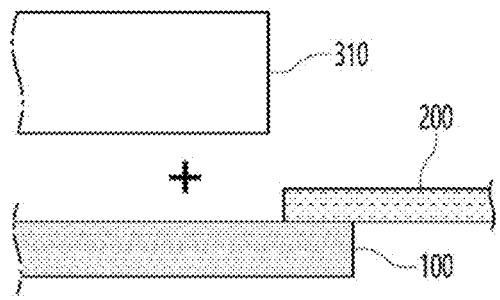
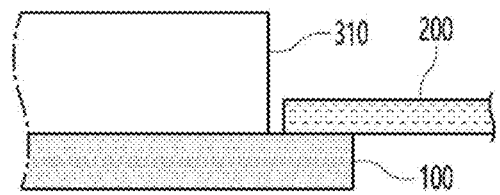
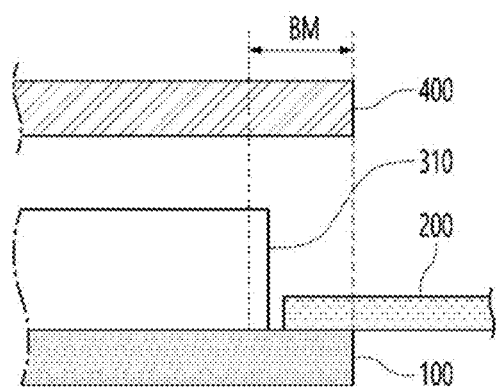

【Figure 3】
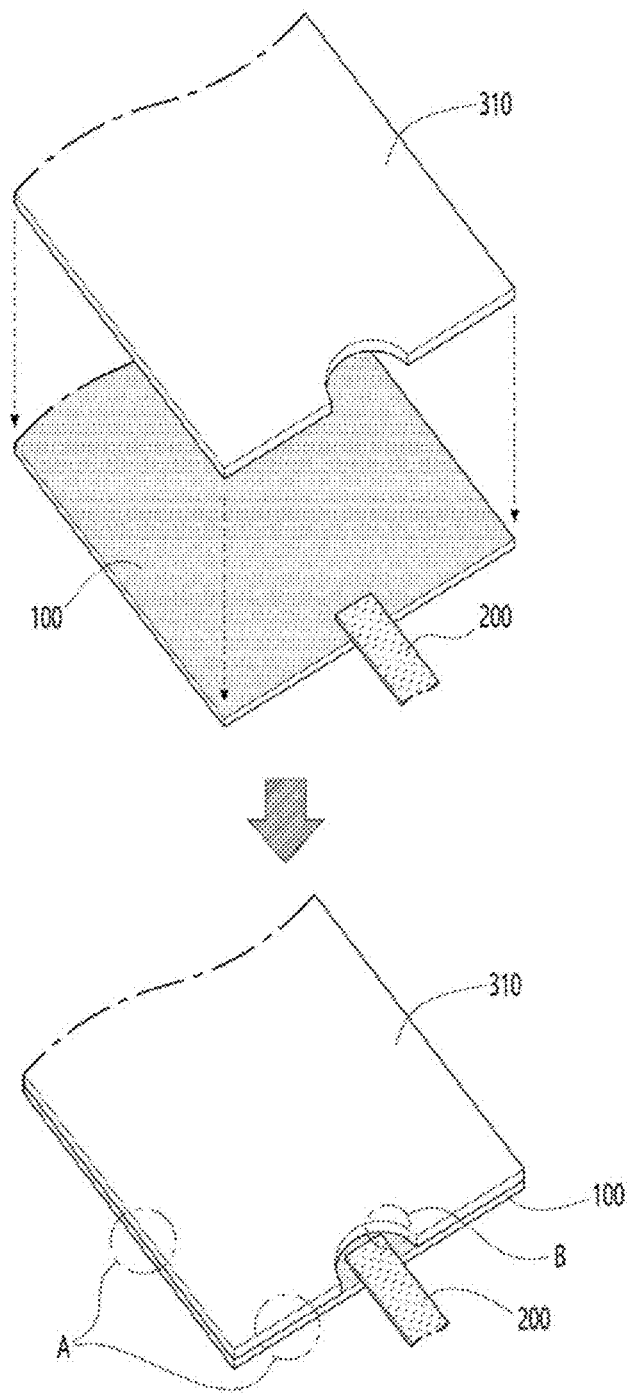

[Figure 4A]
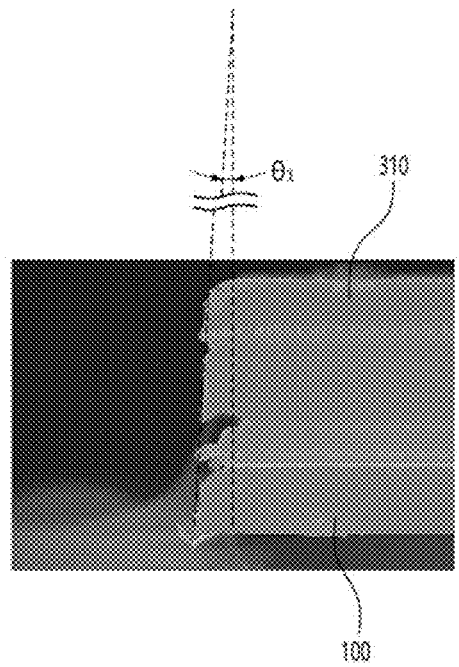
[Figure 4B]
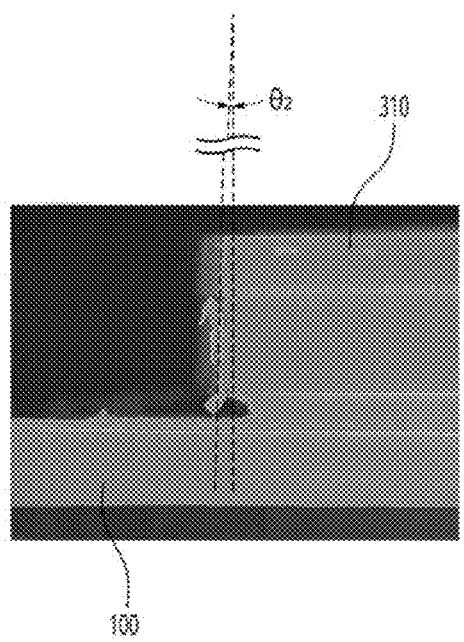

TOUCH SENSOR

CROSS REFERENCE TO RELATED APPLICATIONS

This application claims priority based on Korean Patent Application No. 10-2020-0029428, filed Mar. 10, 2020, the content of which is incorporated herein by reference in its entirety.

TECHNICAL FIELD

The present invention relates to a touch sensor. Specifically, the present invention relates to a touch sensor capable of preventing bubbles from being visually recognized in a display area in a bonding area of an electrode pad portion of a touch sensor layer and a bonding pad portion of a printed circuit board and preventing bonding defects of the bonding area and occurrence of cracks in the touch sensor layer due to foreign matters coming out of a polarizing layer.

BACKGROUND ART

A touch sensor of a smartphone or the like is a device that detects a touch signal. Touch sensors can be classified into a resistive type, a capacitive type, an ultrasonic type, an infrared type, and so on, according to the sensing method of a touch part. Recently, the capacitive type is mainly used.

The capacitive type uses a transparent substrate on which a conductive thin film is formed. When a user touches a surface of a coated transparent substrate with a certain amount of current flowing through the surface of the transparent substrate, the amount of current changes at the contact surface. The capacitive type can detect such a change in current to detect whether or not it is touched.

A touch sensor includes a plurality of sensing electrodes. The sensing electrodes may be classified into the first sensing electrodes connected in the X axis direction and the second sensing electrodes connected in the Y axis direction. The sensing electrodes may be respectively connected to the first and second wiring portions. The first and second wiring portions may extend along the side edges of the transparent base layer to be connected to an electrode pad portion formed at the lower edge of the transparent base layer, that is, a bezel area. The electrode pad portion may be connected to a printed circuit board such as FPC, COF, TCP, or the like through an anisotropic conductive film (ACF) or the like.

FIG. 1 is a cross-sectional view of a touch sensor according to a prior art.

As shown in FIG. 1, when a bonding pad portion of a printed circuit board 200 is bonded to an electrode pad portion of a touch sensor layer 100 and then a polarizing layer 300 is coupled thereon, an area where the polarizing layer 300 is not adhered, that is, a separation space S, is formed at the boundary between the touch sensor layer 100 and the printed circuit board 200 due to the step difference of the bonding pad portion. Accordingly, there may be a problem that a part of the separation space S is visually recognized in the form of bubbles outside the non-display area BM of the cover glass 400, that is, in the display area when it displays with the cover glass 400 coupled.

Moreover, the polarizing layer 300 may release foreign matters such as iodine, dye, liquid crystal, or the like. Iodine or the like may corrode metal materials (wiring, electrode pads, etc.) and adversely affect the operation of the touch sensor. In a conventional touch sensor, iodine or the like may be excessively released from the side of the polarizing layer 300 coupled to the touch sensor layer 100. As a result, cracks may be caused in wiring disposed at the edge of the touch sensor layer 100, and bonding defects and electrode pad cracks may be caused in the bonding area.

DISCLOSURE OF INVENTION

Technical Problem

The present invention is to solve such a problem of the prior art, and an object of the present invention is to fundamentally block the generation of an area where a polarizing layer is not adhered, that is, a separation space at the boundary between a touch sensor layer and a printed circuit board due to the step difference of a bonding pad portion to prevent the separation space, that is, a bubble shape from being visually recognized in a display area.

Another object of the present invention is to block or minimize the release of iodine or the like from the side of the polarizing layer coupled to the touch sensor layer, thereby blocking or minimizing wiring cracks in the touch sensor layer, poor bonding in the bonding area, cracks and corrosion of the electrode pad, and the like.

Yet another object of the present invention is to block or minimize the occurrence of fine cracks or the like in a passivation layer due to impacts generated during processing of the touch sensor.

Technical Solution

A touch sensor of the present invention for achieving these objects may include a touch sensor layer, a polarizing layer, and so on.

The touch sensor layer may have an electrode pad portion in a bezel area.

The polarizing layer may be coupled to the touch sensor layer while opening an area of the electrode pad portion. The polarizing layer may have a side surface of an area of the electrode pad portion defining an altered surface and a side surface excluding the area of the electrode pad portion defining a straight line surface. The altered surface and the straight line surface have a cross-sectional inclination angle of 30° or less in a lateral direction with respect to a vertical direction.

In the touch sensor of the present invention, the altered surface may have a cross-sectional inclination angle of 5° or less in a lateral direction with respect to a vertical direction.

In the touch sensor of the present invention, the straight line surface may have a cross-sectional inclination angle of 5° or more and 30° or less in a lateral direction with respect to a vertical direction.

In the touch sensor of the present invention, the polarizing layer may have a side surface of the area of the electrode pad portion in a round shape in plan view.

A laminate according to the present invention may comprise the touch sensor described above and a window laminated on the touch sensor.

The laminate according to the present invention may further comprise a polarizing layer laminated on one surface of the touch sensor or the window.

The laminate according to the present invention may further comprise a decorative film laminated on one surface of the touch sensor or the window.

Advantageous Effects

The present invention having such a configuration can fundamentally block the generation of an area where a polarizing layer is not adhered, that is, a separation space due to the step difference of a bonding pad portion by removing a bonding area of an electrode pad portion and the bonding pad portion among the polarizing layer.

The present invention can block or minimize cracks and corrosion in the wiring of the touch sensor layer due to iodine or the like released from the side of the polarizing layer by forming the side inclination of the altered surface and the straight line surface of the polarizing layer to be 30° or less.

According to the present invention, by forming the side inclination of the altered surface of the polarizing layer to be 5° or less in the bonding area, iodine or the like released from the altered surface of the polarizing layer can be suppressed as much as possible. Through this, the present invention can block or minimize poor bonding of the electrode pad portion and the bonding pad portion, and cracks and corrosion of the electrode pad.

In addition, according to the present invention, by forming the side inclination of the straight line surface of the polarizing layer to be 5° or more and 30° or less, the amount of iodine or the like released from the straight line surface of the polarizing layer can be suppressed. At the same time, the present invention can protect a passivation layer from impacts generated during processing of the touch sensor.

DESCRIPTION OF DRAWINGS

FIG. 1 is a cross-sectional view of a touch sensor according to a prior art.

FIG. 2 is a cross-sectional view of a touch sensor according to the present invention.

FIG. 3 is a plan perspective view of a touch sensor according to the present invention.

FIGS. 4A and 4B are photographs showing cross-sectional inclinations of a straight line surface and an altered surface of a polarizing layer in a touch sensor according to the present invention.

BEST MODE

Hereinafter, the present invention will be described in detail with reference to the accompanying drawings.

In the following description, the term 'altered surface' refers to a side surface of a polarizing layer (depressed area) that is bonded to an area where an electrode pad portion is formed. The term 'straight line surface' refers to a side surface of the polarizing layer (straight line area) excluding the electrode pad portion area.

FIG. 2 is a cross-sectional view of a touch sensor according to the present invention. FIG. 3 is a plan perspective view of a touch sensor according to the present invention.

As shown in FIGS. 2 and 3, the touch sensor according to the present invention may include a touch sensor layer 100, a printed circuit board 200, a polarizing layer 310, and so on.

The touch sensor layer 100 may include a base layer, a sensing electrode portion, a wiring portion, an electrode pad portion, a passivation layer, and so on.

The base layer is a base of the sensing electrode portion, the wiring portion, and the electrode pad portion, and may be composed of, for example, a cyclo-olefin polymer (COP), polycarbonate, polyethylene terephthalate (PET), polymethyl methacrylate, polyimide, polyethylene naphthalate, polyether sulfone, etc.

The base layer may be a separation layer, a protective layer, or a laminate of a separation layer and a protective layer when the touch sensor panel is manufactured by a transfer method. The separation layer may be composed of an organic polymer film, for example, polyimide, poly vinyl alcohol, polyamic acid, polyamide, polyethylene, polystyrene, polynorbornene, etc. The protective layer may include at least one of an organic insulation layer or an inorganic insulation layer. The protective layer can be formed through coating/curing or deposition.

The sensing electrode portion includes a sensing electrode for sensing a touch, which may be patterned on the base layer. It is preferable that the sensing electrode portion has an electrode pattern structure used in a capacitive type. The electrode layer may employ a mutual-capacitance type or a self-capacitance type. In the case of the mutual-capacitance type, it may be a grid pattern with a horizontal axis and a vertical axis. A bridge electrode may be included at an intersection of the electrodes of the horizontal and vertical axes. In the case of the self-capacitance type, it may have a pattern structure in which a change in capacitance is read using one electrode at each point.

The sensing electrode portion may be formed of a transparent conductive layer. The transparent conductive layer may be formed of, for example, a metal, a metal nanowire, a metal oxide, a carbon nanotube, graphene, a conductive polymer, a conductive ink, or the like. As the metal, gold (Au), silver (Ag), copper (Cu), molybdenum (Mo), aluminum (Al), palladium (Pd), Neodymium (Nd), silver-palladium-copper alloy (APC) or the like may be used. As the metal oxide, indium tin oxide (ITO), indium zinc oxide (IZO), indium zinc tin oxide (IZTO), aluminum zinc oxide (AZO), gallium zinc oxide (GZO), fluorine tin oxide (FTO), zinc oxide (ZnO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), aluminum zinc oxide-silver-aluminum zinc oxide (AZO-Ag-AZO), etc. may be used.

When the sensing electrode portion is used for foldable devices, it may be preferable to be formed of a soft conductive material. As the soft conductive material, polyethylenedioxythiophene (PEDOT: poly 3,4-ethylenedioxythiophene), PEDOT:PSS (polystyrene sulfonate), or a mixture of PEDOT:PSS and metal nanowires may be used.

PEDOT:PSS is a polythiophene-based conductive polymer, which is poly(3,4-ethylenedioxythiophene) doped with polystyrene sulfonate (PSS). PEDOT:PSS can be prepared by oxidative polymerization of 3,4-ethylenedioxythiophene (EDOT) in an aqueous solution using PSS as a template for balancing charge. PEDOT:PSS allows PEDOT to be ionic bonded very strongly to the PSS polymer chain. As a result, PEDOT:PSS is not separated from each other in an aqueous solution and can be stably dispersed as polymer gel particles.

Metal nanowires consist of a conductive metal in the form of nano-unit wires. Metal nanowires may be, for example, silver (Ag), gold (Au), copper (Cu), nickel (Ni), platinum (Pt), palladium (Pd), or aluminum (Al) nanowires, or may be core-shell wires with a combination thereof. The nanowires can be connected to each other to act as electrodes. Nanowires can be transparent due to their nano-sized dimension.

The wiring portion transmits a sensing signal from the sensing electrode portion to the electrode pad portion, and may be formed in the edge area of the base layer, that is, a bezel area. The wiring portion may be formed of a conductive material, for example, a conductive metal such as nickel, cobalt, silver, copper, gold, or palladium, a conductive metal oxide, or a laminate thereof.

The electrode pad portion transmits the sensing signal received through the wiring portion to the outside, that is, the printed circuit board, and may be formed in the edge area of the base layer, that is, the bezel area.

The electrode pad portion may include an electrode pad connected to the wiring portion to transmit a sensing signal, and a dummy pad which is not connected to the wiring portion.

The electrode pad may have a width of 10 μm to 40 μm and a length of 0.5 mm to 2.0 mm, for example. The electrode pad may be made of a conductive metal such as nickel, cobalt, silver, copper, gold, and palladium, and, in this case, it may have a height of 0.2 um to 0.5 um. The spacing between the electrode pads, that is, the pitch, may be 10 μm to 40 μm similar to the width.

The dummy pad may have the same size as the electrode pad. The dummy pad may have the same height with the smaller width and length. Alternatively, The dummy pad may have the same height and width with the smaller length.

The passivation layer insulates and protects the sensing electrode portion and the wiring portion, and may be formed on the sensing electrode portion, the wiring portion, and the base layer. The passivation layer may be formed to open the electrode pad portion connected to the printed circuit board 200. The passivation layer may be composed of one or more materials selected from a curable prepolymer, a curable polymer, and a plastic polymer, which are general insulators.

The passivation layer may be made of a varnish-type material capable of forming a film. The varnish-type material may be polysilicon, such as polydimethylsiloxane (PDMS) or polyorganosiloxane (POS), polyimide, or polyurethane, such as spandex. The varnish-type material is a soft insulation material and can increase the stretchability and dynamic folding capability of the touch sensor panel.

The printed circuit board 200 may be bonded to the electrode pad portion of the touch sensor layer 100 via a conductive film.

The bonding pad portion of the printed circuit board 200 may be made of the same material as the electrode pad portion, for example, a conductive metal such as nickel, cobalt, silver, copper, gold, palladium, a conductive metal oxide, or a laminate thereof.

The bonding pad portion may include a plurality of bonding bumpers protruding downward and electrically connected to the electrode pads. The bonding bumper may be configured with the same width and length as the electrode pad, for example, a width of 10 μm to 40 μm, a length of 0.5 mm to 2.0 mm. The bonding bumper may be configured with a thickness of 5 μm to 15 μm, which is thicker than that of the electrode pad. The spacing between the bonding bumps, that is, the pitch, may be configured to be 10 μm to 40 μm, the same as the pitch of the electrode pads. The bonding pad portion may not have a dummy bumper corresponding to the dummy pad, but may be provided with a dummy bumper.

As the conductive film, an anisotropic conductive film (ACF) may be used. One side of the conductive film is coupled to the electrode pad of the touch sensor layer 100 and the other side is coupled to the bonding bumper of the printed circuit board 200 to electrically connect the touch sensor layer 100 and the printed circuit board 200.

The anisotropic conductive film is an adhesive film in the form of a double-sided tape and may include an adhesive curable by heat and fine conductive balls floating therein.

The fine conductive balls positioned on the electrode pad and the bonding bumper may conduct electricity between the electrode pad and the bonding bumper, when the anisotropic conductive film is pressed between the electrode pad and the bonding bumper. As the fine conductive balls, metal particles, metal-coated resin particles, or the like may be used. As the metal particles, nickel, cobalt, silver, copper, gold, palladium, solder particles, etc. may be used alone or in combination of two or more. Metal-coated resin particles may be resins such as styrene-divinylbenzene copolymer, benzoguanamine resin, crosslinked polystyrene resin, acrylic resin, and styrene-silica composite resin with conductive metals such as nickel, silver, solder, copper, gold, palladium coated on the surface thereof. These can be used alone or in combination of two or more. The conductive ball may have a diameter of 3 μm to 15 μm, and may be included in an amount of 1 to 15 wt % of the total weight.

The adhesive may be cured while filling the space between the electrode pad and the bonding bumper, thereby performing an adhesive function.

The polarizing layer 310 may be formed on the touch sensor layer 100 while opening the electrode pad portion area.

As the polarizing layer 310, for example, those in which a protective layer is formed on at least one surface of a polarizer dyed with iodine or a dichroic dye after stretching a polyvinyl alcohol film, a liquid crystal aligned to have the performance of a polarizer, a transparent film coated with an oriented resin such as polyvinyl alcohol, and then stretched and dyed, or the like may be used.

The polarizing layer 310 may have an area opening the electrode pad portion, and the area may be configured to have various shapes such as a square, a polygon, a circle, an ellipse, etc. in plan view. In order to minimize the stress applied to the electrode pad of the touch sensor layer 110 or the like, the polarizing layer 310 may preferably be configured to include a round shape such as a circle or an ellipse, as shown in FIG. 3.

The side cross-sectional angle (the angle measured while going from vertical to the side) of the polarizing layer 310 relates to the exposed area of the side surface of the polarizing layer 310. For example, as the cross-sectional angle increases, the exposed area of the side surface of the polarizing layer 310 increases, and, as a result, the amount of iodine or the like released through the side surface of the polarizing layer 310 may increase. Iodine or the like corrodes the wiring of the touch sensor layer 100 to cause cracks, or corrodes the electrode pads in the bonding area to cause cracks or poor bonding. Accordingly, it is necessary to minimize the amount of iodine or the like released from the polarizing layer 310. Minimizing the amount of iodine or the like depends on how much the exposed area of the side surface of the polarizing layer 310 can be minimized. It can be said that the exposed area of the side surface of the polarizing layer 310 becomes the minimum when the cross-sectional angle is vertical (0°), and becomes the maximum when the cross-sectional angle is horizontal (90°).

Table 1 below shows that the amount of iodine released from the polarizing layer 310 according to the side cross-sectional angle of the polarizing layer 310 was measured according to the cross-sectional angle. A reference value is set at the amount of iodine released at room temperature for 24 hours when the side cross-sectional angle is horizontal (90°). When the reference value is 100%, the amount of iodine released from each cross-sectional angle is expressed as a percentage.

TABLE 1

| Side Cross-sectional Angle (°) | Iodine Release Amount (%) |
|---|---|
| 0 | 0.04 |
| 3 | 0.1 |
| 5 | 0.5 |
| 7 | 2.5 |
| 10 | 4.0 |
| 13 | 5.2 |
| 15 | 6.8 |
| 20 | 7.5 |
| 25 | 8.8 |
| 30 | 9.9 |
| 40 | 18.5 |
| 50 | 28.0 |
| 60 | 42.5 |
| 70 | 67.5 |
| 90 | 100 |

As can be seen from Table 1 above, as the side cross-sectional angle of the polarizing layer 310 increases, the amount of iodine release increases.

According to the mass production and product acceptance standards, it is required to limit the amount of iodine released from the side surface of the polarizing layer 310 to be within 10% of the maximum value. According to this standard, it can be seen that the cross-sectional angle at which the amount of iodine release satisfies within 10% of the maximum amount of iodine release is from vertical (0°) to 30°.

Meanwhile, since the electrode pad portion is exposed in the bonding area, the electrode pad may experience a direct and large influence such as corrosion from iodine. Therefore, the requirement for the cross-sectional angle of the side surface (altered surface) of the polarizing layer 310 surrounding the open area of the electrode pad portion needs to be severer than 10% allowance according to the general mass production standard. As a result of several experiments, it was confirmed that 0.5% is appropriate for the severe allowance. It can be seen that the cross-sectional angle of the side surface (altered surface) of the polarizing layer 310 that satisfies this severe standard is from vertical (0°) to 5°.

If the side cross-sectional angle of the polarizing layer 310 is reduced, the amount of iodine release may be reduced. However, as the exposed area is reduced, an impact generated during processing of the touch sensor may strongly act on the passivation layer.

Table 2 below shows the measurement of the presence or absence of cracks in the passivation layer according to the side cross-sectional angle of the polarizing layer 310. In Table 2, it is indicated as 'NG' when cracks occur in the passivation layer, and it is indicated as 'OK' when no cracks occur.

TABLE 2

| Side Cross-sectional Angle (°) | Crack Occurrence in Passivation Layer |
|---|---|
| 0 | NG |
| 1 | NG |
| 2 | NG |
| 3 | NG |
| 4 | NG |
| 5 | OK |
| 6 | OK |
| 7 | OK |
| 8 | OK |
| 10 | OK |
| 15 | OK |
| 20 | OK |
| 30 | OK |

In Table 2 above, it can be seen that cracks occur in the passivation layer when the side cross-sectional angle of the polarizing layer 310 is small, that is, at 0° to 4°. Therefore, it may be desirable to meet up to the condition to block or minimize the occurrence of cracks in the passivation layer in the area less sensitive to iodine or the like than the bonding area, which is the area of the touch sensor excluding the electrode pad portion area B (altered surface), i.e., the edge area A (straight line surface).

Summarizing Tables 1 and 2, it is preferable to form the side inclination of the straight line surface of side surface of the polarizing layer 310 to be 5° or more and 30° or less. Through this, the amount of iodine release can be suppressed as much as possible on the straight line surface of the polarizing layer 310, and, at the same time, microcracks that may occur in the passivation layer due to processing impact can be blocked or minimized.

FIGS. 4A and 4B are photographs showing cross-sectional inclinations of a straight line surface and an altered surface of a polarizing layer in a touch sensor according to the present invention.

First, FIG. 4A shows the side surface of the polarizing layer outside the electrode pad portion area, that is, the straight line surface formed along the outer boundary. Although the cross-sectional angle $\theta_1$ of the side surface is close to vertical, that is, 0°, it is formed to be less vertical than the cross-sectional angle $\theta_2$ of the altered surface.

FIG. 4B shows the side surface of the polarizing layer in the area of the electrode pad portion, that is, the altered surface, and it can be seen that the cross-sectional angle $\theta_2$ of the side surface is formed to be close to 0°, that is, almost vertical.

Various methods including mechanical cutting such as polishing and punching, and optical cutting using a laser may be used to form the straight line surface and the altered surface of FIGS. 4A and 4B.

A laminate according to the present invention may comprise the touch sensor described above and a window laminated on the touch sensor.

The laminate according to the present invention may further comprise a polarizing layer laminated on one surface of the touch sensor or the window.

The laminate according to the present invention may further comprise a decorative film laminated on one surface of the touch sensor or the window.

The preferred embodiments of the present invention have been described with reference to the drawings. However, the present invention is not limited to the above-described embodiment, and it will be understood that the present invention can be implemented in a modified form without departing from the essential characteristics of the present invention. Therefore, the scope of the present invention is defined by the claims rather than the foregoing description, and all differences within the equivalent range should be interpreted as being included in the present invention.

DESCRIPTION OF REFERENCE NUMERALS

110: touch sensor layer
300, 310: polarizing layer
S: separation space
$\theta_1$: straight line surface cross-sectional angle
$\theta_2$: altered surface cross-sectional angle
200: printed circuit board
400: cover glass
BM: non-display area

The invention claimed is:

1. A touch sensor comprising:
   a touch sensor layer having an electrode pad portion formed in a bezel area; and a polarizing layer coupled to the touch sensor layer while opening an area of the electrode pad portion and having a side surface of an area of the electrode pad portion defining an altered surface and a side surface excluding the area of the electrode pad portion defining a straight line surface, wherein the altered surface has a cross-sectional inclination angle of 30° or less in a lateral direction with respect to a vertical direction, and the straight line surface has a cross-sectional inclination angle of 5° or more and 30° or less in a lateral direction with respect to a vertical direction.

2. The touch sensor according to claim 1, wherein the altered surface has a cross-sectional inclination angle of 5° or less in a lateral direction with respect to a vertical direction.

3. The touch sensor according to claim 1, wherein the polarizing layer has a side surface of the area of the electrode pad portion in a round shape in plan view.

4. A laminate comprising:

the touch sensor according to claim 1; and a window laminated on the touch sensor.

5. The laminate according to claim 4, further comprising a polarizing layer laminated on one surface of the touch sensor or the window.

6. The laminate according to claim 5, further comprising a decorative film laminated on one surface of the touch sensor or the window.

7. The touch sensor according to claim 2, wherein the polarizing layer has a side surface of the area of the electrode pad portion in a round shape in plan view.

8. A laminate comprising:

the touch sensor according to claim 2; and a window laminated on the touch sensor.

* * * * *